US011173782B2

(12) United States Patent
Kumar et al.

(10) Patent No.: US 11,173,782 B2
(45) Date of Patent: Nov. 16, 2021

(54) CONTROL STRATEGIES FOR SINGLE AND MULTI MODE ELECTRIC SECONDARY OR TAG ELECTRIC AXLES

(71) Applicant: Dana Heavy Vehicle Systems Group, LLC, Maumee, OH (US)

(72) Inventors: Krishna Kumar, Holland, OH (US); Vivian Valerian D'Souza, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/046,728

(22) PCT Filed: Apr. 15, 2019

(86) PCT No.: PCT/US2019/027504
§ 371 (c)(1),
(2) Date: Oct. 9, 2020

(87) PCT Pub. No.: WO2019/200389
PCT Pub. Date: Oct. 17, 2019

(65) Prior Publication Data
US 2021/0162855 A1    Jun. 3, 2021

Related U.S. Application Data

(60) Provisional application No. 62/657,010, filed on Apr. 13, 2018.

(51) Int. Cl.
*B60W 20/40*        (2016.01)
*B60K 6/52*         (2007.10)
(Continued)

(52) U.S. Cl.
CPC ............... *B60K 6/52* (2013.01); *B60W 10/02* (2013.01); *B60W 10/08* (2013.01); *B60W 10/14* (2013.01);
(Continued)

(58) Field of Classification Search
CPC ...... B60W 10/02; B60W 20/14; B60W 20/40; B60W 2710/021; B60W 2510/18;
(Continued)

(56) References Cited

U.S. PATENT DOCUMENTS 5,301,764 A * 4/1994 Gardner .............. B60W 30/143
                                                 180/65.23
2006/0048982 A1 * 3/2006 Yamamoto ............ B60W 20/00
                                                 180/65.225

(Continued)

FOREIGN PATENT DOCUMENTS

CN       104590262 A  *  5/2015
CN       106143106 A  *  11/2016
(Continued)

OTHER PUBLICATIONS

English translation of WO2004033244A1; http://translatinportal. epo.org; Jun. 22, 2021 (Year: 2021).*

(Continued)

*Primary Examiner* — Roger L Pang
(74) *Attorney, Agent, or Firm* — McCoy Russell LLP

(57) ABSTRACT

A method of controlling an axle assembly includes providing an axle assembly in a first state. A first controller is provided in electrical communication with the axle assembly. The first controller determines if a source of power has an available amount of electrical energy that is within a predetermined range and a predetermined period of time has elapsed. If the available amount of electrical energy is within the predetermined range and the predetermined period of
(Continued)

time has elapsed, then electrical energy is transferred from the source of power to an electric motor generator and an axle disconnect clutch is engaged to provide the axle assembly in another state.

20 Claims, 7 Drawing Sheets

(51) Int. Cl.
    *B60W 20/14*     (2016.01)
    *B60W 10/02*     (2006.01)
    *B60W 10/14*     (2012.01)
    *B60W 10/08*     (2006.01)
    *B60W 30/14*     (2006.01)

(52) U.S. Cl.
    CPC ............ *B60W 20/14* (2016.01); *B60W 20/40* (2013.01); *B60W 30/14* (2013.01); *B60W 2300/126* (2013.01); *B60W 2510/0208* (2013.01); *B60W 2510/081* (2013.01); *B60W 2510/18* (2013.01); *B60W 2510/244* (2013.01); *B60W 2520/28* (2013.01); *B60W 2530/16* (2013.01); *B60W 2540/10* (2013.01); *B60W 2552/15* (2020.02); *B60W 2710/021* (2013.01); *B60W 2710/081* (2013.01); *B60W 2720/40* (2013.01)

(58) Field of Classification Search
    CPC ....... B60W 2540/10; B60W 2510/244; B60W 2520/28; B60W 2300/126; B60W 2510/081; B60W 10/14; B60W 30/14; B60W 2510/0208; B60W 2530/16; B60W 2710/081; B60W 2720/40; B60K 6/52

See application file for complete search history.

(56) References Cited

U.S. PATENT DOCUMENTS

| | | |
|---|---|---|
| 2011/0209933 A1 | 9/2011 | Muggeo et al. |
| 2014/0121870 A1 | 5/2014 | Lee |
| 2016/0339906 A1* | 11/2016 | Nefcy ................. B60K 6/48 |
| 2018/0056974 A1* | 3/2018 | Meyer ................. B60K 6/48 |
| 2018/0093655 A1 | 4/2018 | Healy et al. |

FOREIGN PATENT DOCUMENTS

| | | | |
|---|---|---|---|
| DE | 102008030581 A1 | 12/2009 | |
| DE | 102016217941 A1 | 3/2018 | |
| WO | 2004033244 A1 | 4/2004 | |
| WO | WO-2014087587 A1 * | 6/2014 | ......... B60H 1/00685 |

OTHER PUBLICATIONS

ISA European Patent Office, International Search Report and Written Opinion Issued in Application No. PCT/US2019/027504, dated Jul. 4, 2019, WIPO, 14 pages.

\* cited by examiner

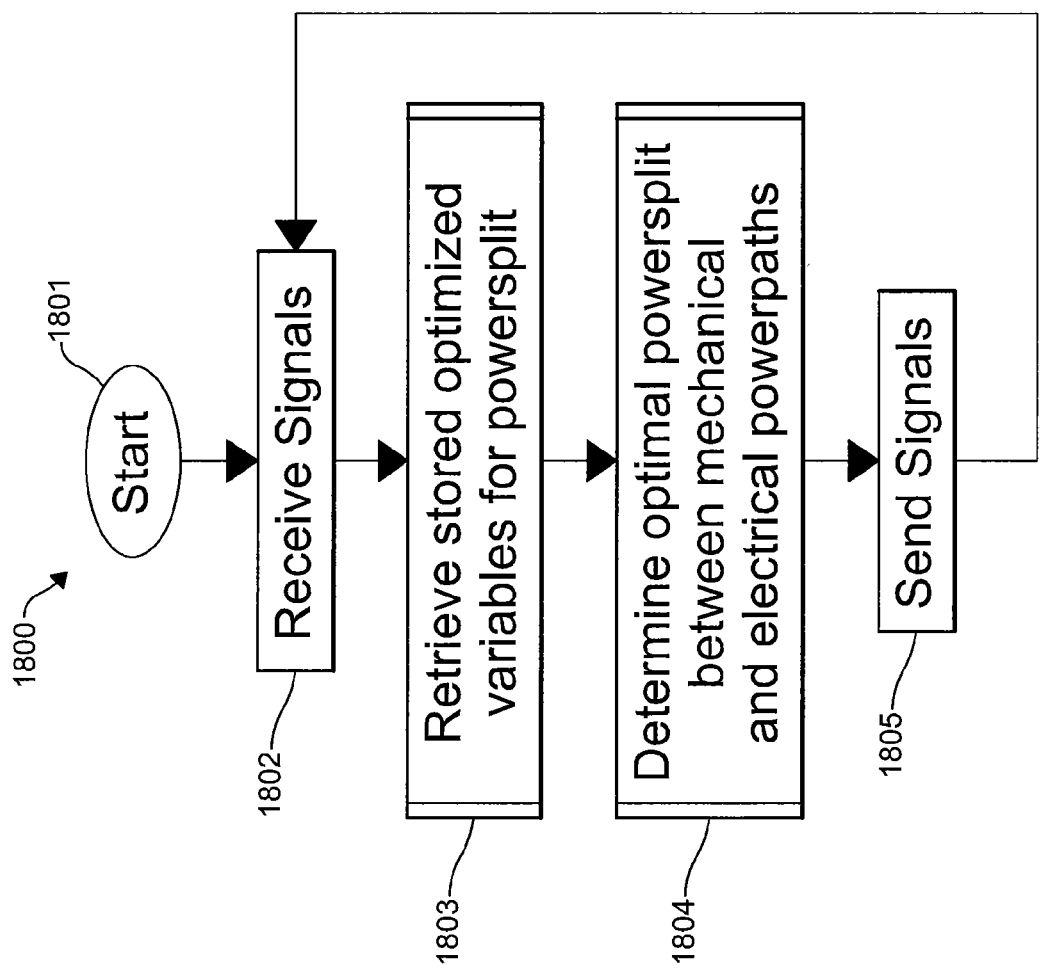

CONTROL STRATEGIES FOR SINGLE AND MULTI MODE ELECTRIC SECONDARY OR TAG ELECTRIC AXLES

CROSS-REFERENCE TO RELATED APPLICATIONS

The present application is a U.S. national phase of International Application No. PCT/US2019/027504, entitled "CONTROL STRATEGIES FOR SINGLE AND MULTI MODE ELECTRIC SECONDARY OR TAG ELECTRIC AXLES", and filed on Apr. 15, 2019. International Application No. PCT/US2019/027504 claims priority to U.S. Provisional Patent Application No. 62/657,010, entitled "CONTROL STRATEGIES FOR SINGLE AND MULTI MODE ELECTRIC SECONDARY OR TAG ELECTRIC AXLES", and filed on Apr. 13, 2018. The entire contents of the above-listed applications are hereby incorporated by reference for all purposes.

BACKGROUND

Hybrid vehicles are enjoying increased popularity and acceptance due in large part to the cost of fuel and greenhouse carbon emission government regulations for internal combustion engine vehicles. Such hybrid vehicles include both an internal combustion engine as well as an electric motor to propel the vehicle.

Commercial vehicles or trailers having two or more rear axles allow such vehicles to carry greater loads when compared to vehicles and trailers having a single axle. A typical six-wheel drive arrangement for a motor vehicle includes an axle having steerable wheels at the front end of the vehicle and tandem axles at the rear of the vehicle.

Traditional tandem axle drivetrains include 6×4 drivetrains (i.e., 2 wheels on the steer axle and 4 driving wheels on tandem axles behind the steer axle) or 6×2 drivetrains (i.e., 2 wheels on the steer axle and 4 wheels on the tandem axles behind the steer axle where only two wheels are on a drive axle). Any axle in the tandem axles may be a drive axle or a dead axle. When an additional axle (secondary axle) is a dead axle, it may be positioned before (a pusher axle) or after (a tag axle) a drive axle.

It may be useful and advantageous to have an electric tag axle with high reduction capabilities using an existing electric motor that is efficient and compact. Additionally, it may be beneficial to have an electric driven axle that can provide high torque ratios and energy harvesting/energy recuperation abilities.

Therefore, there is a need for improved control of a secondary or tag electric axle hybrid electric drivetrain system as described above to optimize the powersplit between the engine and an electric motor generator.

SUMMARY

Embodiments of a method of controlling an axle assembly are provided.

In an embodiment, the method comprises providing an axle assembly in a first state. A first controller is provided in electrical communication with the axle assembly. The controller determines if a source of power has an available amount of electrical energy that is within a predetermined range and a predetermined period of time has elapsed. If the available amount of electrical energy is within the predetermined range and the predetermined period of time has elapsed, then electrical energy is transferred from the source of power to an electric motor generator and an axle disconnect clutch is engaged to provide the axle assembly in another state.

In some embodiments, the method comprises determining if a brake light switch has been activated, a cruise control mode has been deactivated, or a road grade is above a predetermined road grade threshold.

In some embodiments, the electric motor generator provides a motor speed that is within a predetermined range of a wheel speed of a wheel and the first controller sends a signal to engage the axle disconnect clutch.

In some embodiments, the another state is a second state and the axle assembly transitions to a third state. In an embodiment, the third state comprises one or more substates.

In some embodiments, the one or more substates includes a 6x4 Hi substate and a 6x4 Low substate. From the second state, the axle assembly may enter the 6x4 Hi substate when a vehicle speed is above a predetermined vehicle speed threshold or 6x4 Low substate when the vehicle speed is below the predetermined vehicle speed threshold.

In some embodiments, the axle assembly transitions to the 6×4 Low substate from the 6×4 Hi substate when the vehicle speed is below the predetermined vehicle speed threshold.

In some embodiments, the axle assembly transitions to the 6x4 Low substate from the 6x4 Hi substate by way of another substate. In other embodiments, the axle assembly transitions to the 6x4 Hi substate from the 6x4 Low substate by way of another substate. The another substate may be a transition shift actuator substate. In the transition shift actuator substate, the axle disconnect clutch may be disengaged and the electric motor generator 142 brings an axle speed of an axle to a desired speed before the axle disconnect clutch 150 is re-engaged. In the transition shift actuator substate, the shift actuator may move to a desired position.

In some embodiments, the axle assembly enters a 6×4 assist substate from the 6×4 Hi substate or the 6×4 Low substate. In an embodiment, the axle assembly enters the 6×4 assist substate from the 6×4 Hi substate when cruise control is deactivated and the available amount of electrical energy from the source of power is within the predetermined range. In another embodiment, the axle assembly enters the 6×4 assist substate from the 6×4 Hi substate when cruise control is activated, the available amount of electrical energy from the source of power is within the predetermined range, and a road grade is above a predetermined road grade threshold. In still other embodiments, the axle assembly enters the 6×4 assist substate from the 6×4 Low substate when the available amount of electrical energy from the source of power is within the predetermined range and the vehicle speed is less than the predetermined vehicle speed threshold.

In some embodiments, the axle assembly enters a generate substate from the 6×4 Hi substate or the 6×4 Low substate. The generate substate may comprise a coasting regeneration substate, regenerative braking substate, downhill generate substrate, and battery replenish substate.

In a second state, electrical energy may be transferred from the source of power to the electric motor generator and the axle disconnect clutch is engaged.

In some embodiments, the method comprises providing a signal indicative of a wheel speed and determining if a corrected motor speed is within a predetermined threshold of the wheel speed.

In other embodiments, the first controller sends a signal to engage the axle disconnect clutch.

In some embodiments, the first controller receives a signal from an axle disconnect clutch sensor indicative of the axle disconnect clutch being engaged.

In a second state, the electric motor generator may provide a motor speed and, in a third state, an axle disconnect clutch is engaged and the axle assembly provides a traction force.

The first state may be a 6x2 state, the second state is a synchronization state, and the third state is a 6x4 state.

In the third state, a gearbox may be in driving engagement with a differential gear set.

In some embodiments, the axle assembly transitions from the third state to a fourth state when a vehicle cruise control is activated, a road grade is below a predetermined road grade threshold, and a predetermined period of time has elapsed.

In some embodiments, the axle assembly transitions from fourth state to the first state after the first controller sends a signal to the gearbox to urge a shift actuator into a neutral position.

In some embodiments, the axle assembly transitions from the fourth state to the first state when the first controller sends a signal to the axle disconnect clutch to disengage, the first controller receives a signal from an axle disconnect clutch sensor indicative of the axle disconnect clutch being disengaged, the first controller receives a signal indicative of the shift actuator being in the neutral position, and the first controller sends a signal to the electric motor generator to deactivate. In the first state, the axle assembly may not provide a traction force.

In other embodiments, the axle assembly remains in the fourth state so long as the motor speed is above a predetermined threshold.

BRIEF DESCRIPTION OF THE FIGURES

The above, as well as other advantages of the method will become readily apparent to those skilled in the art from the following detailed description when considered in the light of the accompanying drawings in which:

FIG. 7 is a schematic view of an embodiment of a control process.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments. Hence, specific dimensions, directions, orientations or other physical characteristics relating to the embodiments disclosed are not to be considered as limiting, unless expressly stated otherwise.

Figure 1:
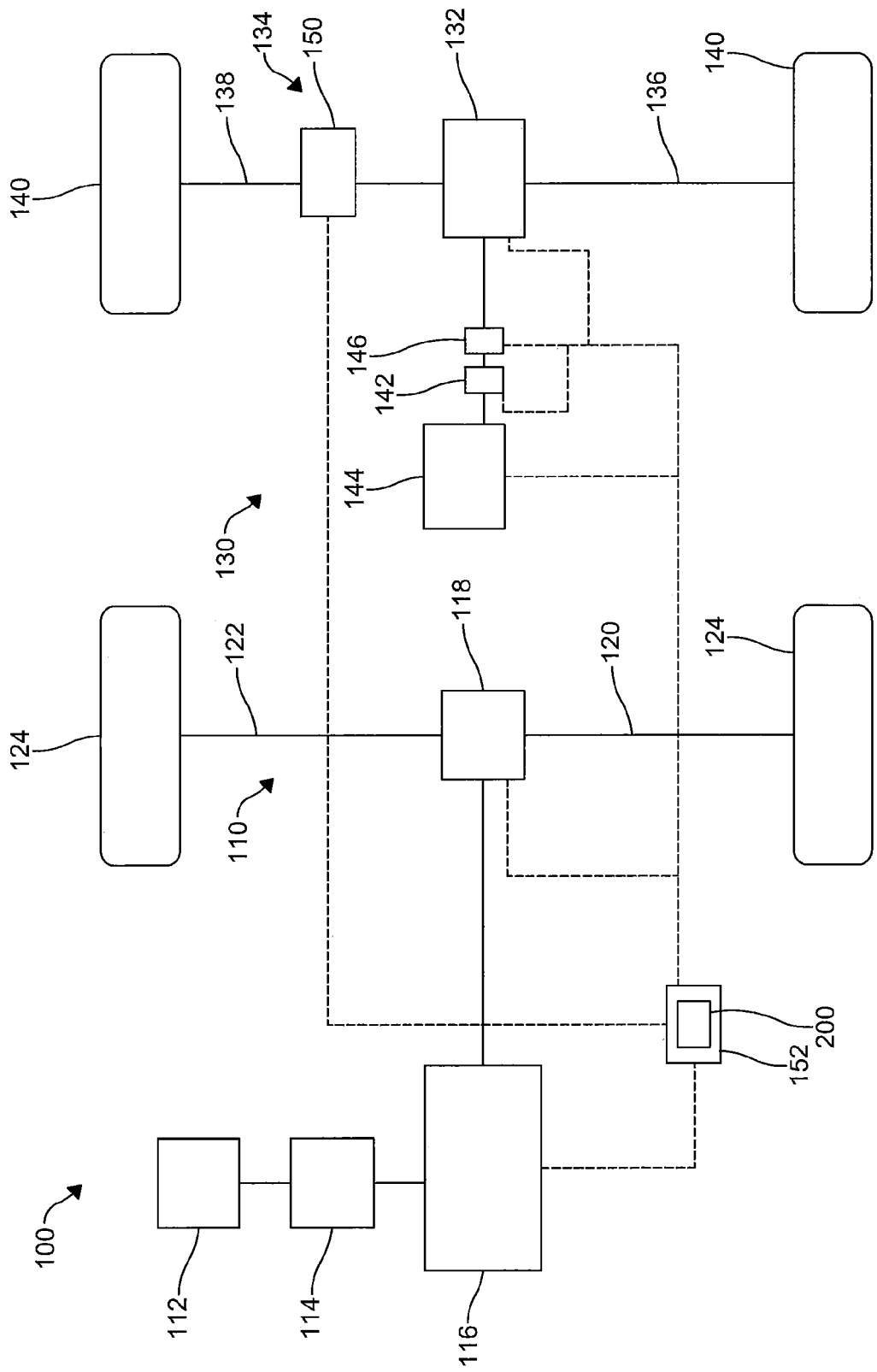
FIG. 1 is a schematic view of an embodiment of a tandem axle drivetrain with the steer axle removed for clarity.

FIG. 1 depicts an embodiment of a tandem axle arrangement for a vehicle drivetrain 100. In some embodiments, the vehicle drivetrain 100 includes a first axle 110. The first axle 110 may be a front axle in the tandem axle arrangement. The vehicle drivetrain 100 comprises an axle assembly 130. The axle assembly 130 may be a rear axle in the tandem axle arrangement. In some embodiments, the vehicle drivetrain 100 includes the first axle 110 as a front axle and the axle assembly 130 provides a rear axle. In these embodiments, the axle assembly 130 may be referred to as a tag axle. However, in other embodiments (not depicted), the axle assembly may be utilized as the front axle. In these embodiments, the axle assembly may be referred to as a pusher axle.

A power source 112 may be provided to provide power to the vehicle drivetrain 100. In some embodiments, the power source 112 is an internal combustion engine. The power source 112 communicates with a clutch 114. Power from the power source 112 is communicated to a transmission 116 by way of the clutch 114. More particularly, an output shaft (not depicted) from the clutch 114 is drivingly engaged with an input shaft (not depicted) of a transmission 116. It is understood that the transmission 116 may be either an automatic transmission or a manual transmission.

In some embodiments, the transmission 116 includes multiple reducing gear passes and an automatic transmission clutch (AMT) or clutches to provide the desired transmission ratios for the application. In some embodiments, the transmission 116 communicates with a first differential gear set 118 to transmit power from the power source 112 to the first axle 110.

In some embodiments, the first differential gear set 118 provides a reduction ratio. The first differential gear set 118 is drivingly connected to the first axle 110. The first axle 110 may be a primary drive axle for the vehicle drivetrain 100. The first axle 110 comprises a first shaft 120 and a second shaft 122. The first differential gear set 118 provides a side-to-side differential action between the first shaft 120 and the second shaft 122. Each shaft 120, 122 is drivingly engaged with a wheel 124, which each provide traction to drive a vehicle (not shown) the vehicle drivetrain 100 is incorporated in.

The axle assembly 130 may be a secondary drive axle for the vehicle drivetrain 100. The axle assembly 130 includes a differential gear set 132. The differential gear set 132 provides a reduction ratio. The differential gear set 132 is drivingly connected to an axle 134. The axle 134 comprises a first shaft 136 and a second shaft 138. The first differential gear set 132 provides a side-to-side differential action between the first shaft 136 and the second shaft 138. Each shaft 136, 138 is engaged with a wheel 140. In some embodiments, each shaft 136, 138 is drivingly engaged with a wheel 140. In other embodiments, each wheel 140 provides traction to drive the vehicle.

The axle assembly 130 may include an electric motor generator 142. In some embodiments, the electric motor generator 142 includes an inverter (not depicted). In some embodiments, the electric motor generator 142 is connected to a source of power 144. In certain embodiments, the source of power 144 is a battery or another type of energy storage device. Under certain conditions, the source of power 144 provides electrical energy that enables the electric motor generator 142 to drive the axle 134. The source of power 144 has an available amount of electrical energy that can be utilized by the electric motor generator 142 to drive the axle 134. Alternatively, under other conditions, the electric motor generator 142 can be utilized to transfer energy to the source of power 144.

In some embodiments, the electric motor generator 142 is connected to a gearbox 146. The gearbox 146 may include a shift actuator. The gear box 146 may include a set of multiple reducing gear passes to provide the desired ratios for the application.

The axle assembly 130 may include an axle disconnect clutch 150. The axle disconnect clutch 150 may be provided as a portion of the axle 134. Engagement/disengagement of the axle disconnect clutch 150 may be utilized to change the state of the axle assembly 130, which enables the vehicle drivetrain 100 to provide different modes of operation. For example, engagement of the axle disconnect clutch 150 is utilized to change the state of the axle assembly 130 and enable the vehicle drivetrain 100 to provide a 6x4 mode of operation. Typically, the vehicle will be in the 6x4 mode of operation during a vehicle start and a vehicle acceleration. Alternatively, the disengagement of the axle disconnect clutch 150 is utilized to change the state of the axle assembly 130 so that the vehicle drivetrain 100 can provide a 6x2 mode of operation. It should be noted that when the vehicle drivetrain 100 operates in the 6x4 mode of operation, both the first axle 110 and the axle assembly 130 are utilized to provide a traction force for the vehicle. Alternatively, when the vehicle drivetrain 100 operates in the 6x2 mode of operation, the axle disconnect clutch 150 is disengaged and only the first axle 110 provides a traction force for the vehicle. However, it should be understood that the vehicle drivetrain 100 may be configured to drive the axle 134 in the 6x2 mode of operation.

It should be understood that vehicles incorporating embodiments disclosed herein are capable of including a number of other additional powertrain components, such as, but not limited to, high-voltage battery pack with a battery management system or ultracapacitor, on-board charger, DC-DC converters, a variety of sensors, actuators, and controllers, among other. Also, the vehicle drivetrain 100 depicted in FIG. 1 is an exemplary drivetrain. It should be understood that the axle assembly 130 can be included in various drivetrain arrangements including drivetrains with a dual range disconnect system.

The vehicle drivetrain 100 is configured to permit an operator of a vehicle or a control system of the vehicle to switch from a 6x4 mode of operation to a 6x2 mode of operation or vice versa as required by operating conditions. To switch operating modes as desired, the operator may initiate a shifting procedure or a control system may be utilized. Initiating the shifting procedure or utilizing the control system includes providing a method of controlling the axle assembly 130, embodiments of which are described herein. The control system and a methods described herein may be utilized to optimize the powersplit between the power source 112 and the electric motor generator 142 for an improved fuel economy and vehicle dynamic characteristics.

In some embodiments, the control system includes an alpha controller 152 in communication with the vehicle drivetrain 100. It should be understood that the alpha controller 152 may include or be in communication with a plurality of controllers in communication with one another. For example, in some embodiments, the alpha controller 152 may include a first controller 200. The alpha controller 152 may be utilized to determine an optimal condition for changing the state of the axle assembly 130.

In some embodiments, the first controller 200 may implement the method of controlling the axle assembly 130.

Figure 2:
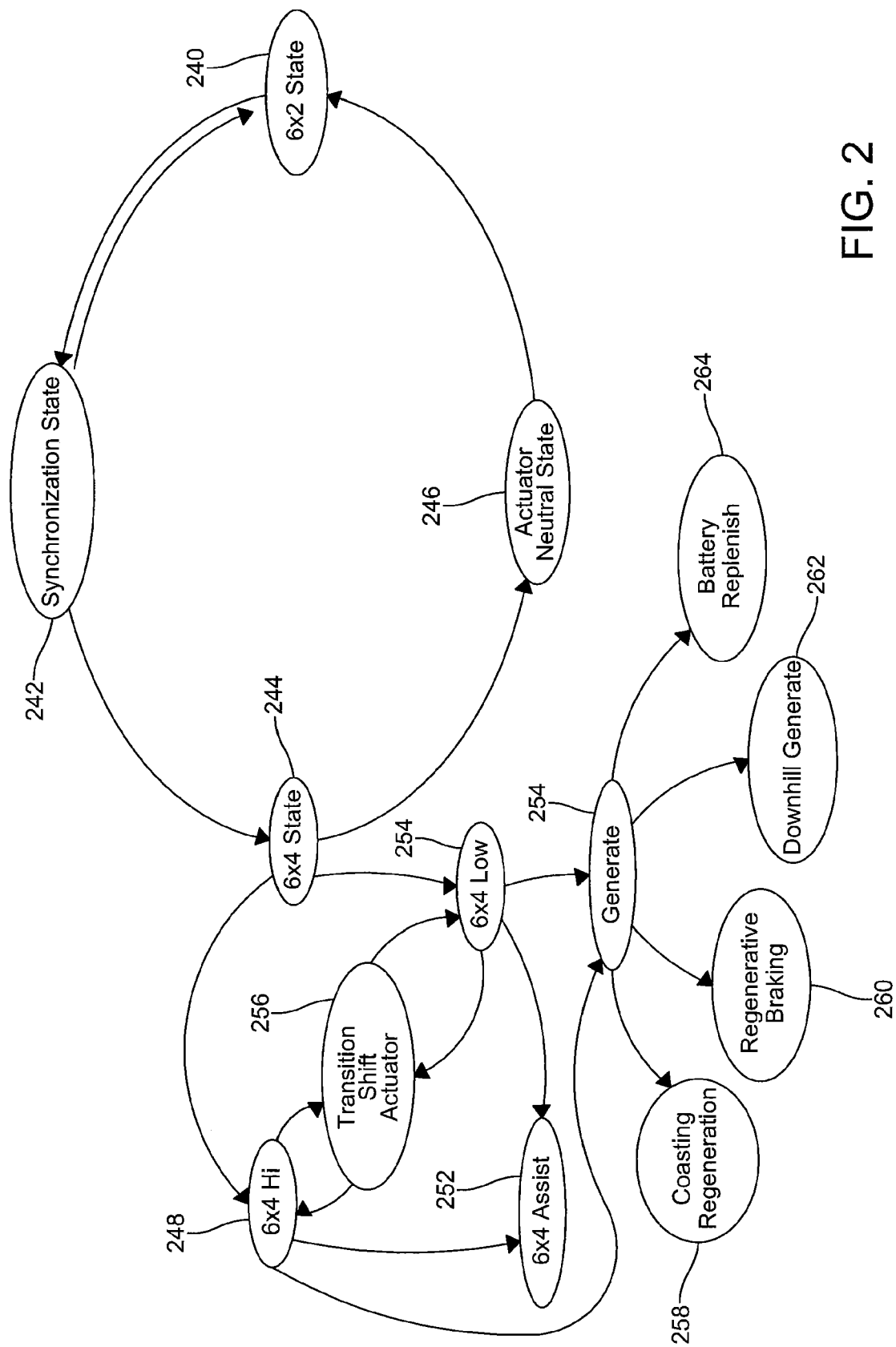
FIG. 2 is a schematic view illustrating embodiments for changes of state of an axle assembly for use in the tandem axle drivetrain of FIG. 1.

Referring now to FIG. 2, which depicts embodiments of the method, the axle assembly 130 may be provided in a first state 240. As used herein, the phrase "first state" may be used interchangeably with the phrase "6x2 state." When the axle assembly 130 is in the 6x2 state 240, the axle assembly 130 does not provide a traction force to the vehicle. When the axle assembly 130 is in the 6x2 state 240, the vehicle drivetrain 100 may be in a 6x2 mode of operation.

Figure 3:
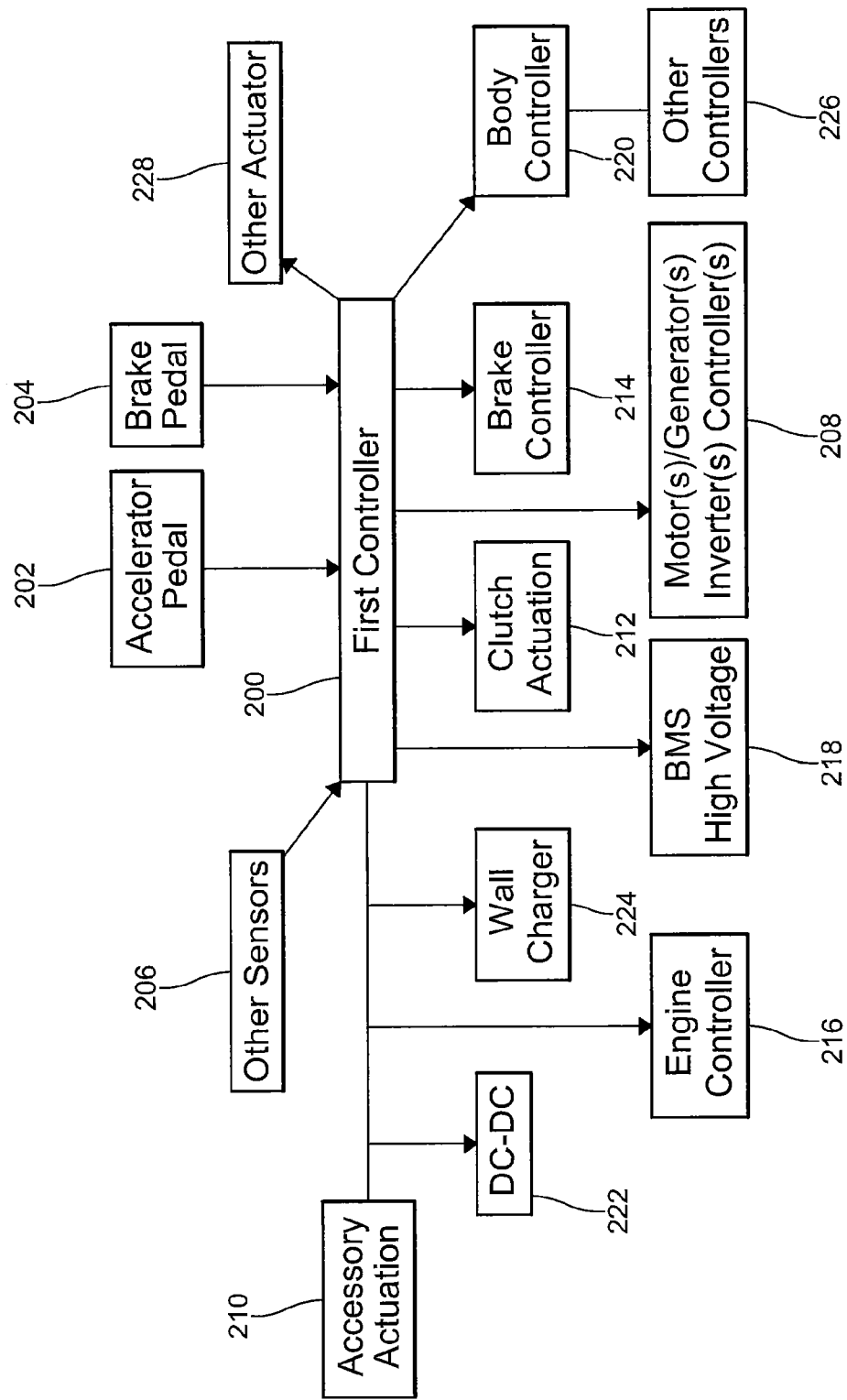
FIG. 3 is a schematic view of an embodiment of a controller utilized to change the state of the axle assembly.

In order for the axle assembly 130 to move to another state, the first controller 200 receives a plurality of input signals obtained from sensors equipped on the vehicle, and delivers a plurality of output signals to actuators and controllers provided on the vehicle. For example, the first controller 200 may be configured to receive signals from an accelerator pedal position sensor 202, a brake pedal position sensor 204, and a number of other sensors 206, which are illustrated in FIG. 3. Other sensors that the first controller 200 may be configured to receive signals from include, for example, input speed sensors, temperature sensors, torque sensors, and a shift actuator position sensor, among others.

In some embodiments, the first controller 200 receives input signals from vehicle sensors including, but not limited to, a state of charge (SOC) estimator, motor speed sensor, generator speed sensor, engine speed sensor, engine torque sensor, and a number of temperature sensors, among others. The first controller 200 performs a number of calculations based at least in part on the input signals to thereby generate the output signals. The output signals are received by, for example, certain control modules equipped on the vehicle. As illustrated in FIG. 3, in some embodiments, the first controller 200 is configured to communicate with a motor/generator inverter control module 208, an accessory actuator module 210, a clutch actuator module 212, a brake control module 214, an engine control module 216, a battery management system (BMS) high voltage control module 218, a body control module 220, a current control module 222, a charger module 224 among other control modules 226 and actuators 228 equipped on the vehicle. It should be appreciated that the motor/generator inverter control module 208 is optionally configured with a number of submodules to perform control functions for those components.

It should be appreciated that the first controller 200 is adapted to communicate with other vehicle controllers via CAN interface or direct electric connection. Also, as illustrated in FIG. 1, the first controller 200 is in electrical communication with the axle assembly 130. For example, the first controller 200 may be in electrical communication with the electric motor generator 142, the gearbox 146, the differential gear set 132, and/or the axle disconnect clutch 150.

Referring back to FIG. 2, the axle assembly 130 may be provided in other states. In an embodiment, the axle assembly 130 may be provided in a second state. As used herein, the phrase "second state" may be used to described a synchronization state 242. When the axle assembly 130 is in a second state, the axle assembly 130 may or may not provide a traction force to the vehicle. For example, when the axle assembly 130 is in the synchronization state 242, the axle assembly 130 does not provide a traction force to the vehicle. However, as another example, when the axle assembly is in a 6x4 state 244, the axle assembly 130 may provide a traction force to the vehicle.

The axle assembly 130 may transition from the 6x2 state 240 to the synchronization state 242 under certain conditions. For example, the axle assembly 130 may transition from the 6x2 state 240 to the synchronization state 242 if the available amount of energy from the source of power 144 is within a predetermined range. In order to determine if the available amount of electrical energy from the source of power 144 is within the predetermined range, the state of charge (SOC) estimator estimates the available amount of electrical energy from the source of power 144 based on the physical characteristics of the source of power 144 and sends a signal to the first controller 200 indicative of the amount of electrical energy available from the source of power 144. The first controller 200 then determines if the amount of electrical energy available from the source of power 144 is within the predetermined range. In some embodiments, the predetermined range is 25-85% of the total amount of electrical energy that the source of power 144 can store. Thus, if, for example, the amount of electrical energy available from the source of power 144 is 50% of the total amount of electrical energy that the source of power 144 can store and the predetermined range is as described above, then the axle assembly 130 may transition from the 6x2 state 240 to the synchronization state 242. In other embodiments, the axle assembly 130 may transition from the 6x2 state 240 to the synchronization state 242 if a predetermined period of time has elapsed. In some embodiments, the predetermined period of time is 150 milliseconds or more.

The axle assembly 130 may transition from the 6x2 state 240 to the synchronization state 242 when the available amount of electrical energy from the source of power 144 is within a predetermined range and the predetermined period of time has elapsed. More preferably, the axle assembly 130 transitions from the 6x2 state 240 to the synchronization state 242 when the available amount of electrical energy from the source of power 144 is within a predetermined range, the predetermined period of time has elapsed, and one or more additional conditions have been satisfied. For example, it may be desirable that a brake light switch has been activated, cruise control has been deactivated, or a road grade is above a predetermined road grade threshold to transition the axle assembly 130 from the 6x2 state 240 to the synchronization state 242. In an embodiment, the predetermined road grade threshold is greater than 0.5 degrees. The road grade can be determined using one or more sensors provided on the vehicle. When the axle assembly 130 transitions from the 6x2 state 240 to the synchronization state 242, electrical energy is transferred from the source of power 144 to the electric motor generator 142 and the axle disconnect clutch 150 is engaged.

In the synchronization state 242, the electric motor generator 142 may receive one or more signals from the first controller 200. In an embodiment, the electric motor generator 142 may receive a first signal from the first controller 200 to be at torque set point of 0 newton meters (N·m). Being at a torque of 0 N·m allows the shift actuator in the gearbox 146 and the axle disconnect clutch 150 to be disengaged. Once the electric motor generator is at a torque of 0 N·m, the first controller 200 may send a second signal that directs the electric motor generator 142 to be at a motor speed that is within a predetermined range of a wheel speed of a wheel 140 engaged with the axle 134. Prior to sending the second signal to the electric motor generator 142, the first controller 200 may receive a signal from a wheel speed sensor indicative of a wheel speed of a wheel 140. The first controller 200 may send additional signals when the axle assembly 130 is in the synchronization state 242. For example, the first controller 200 may send a signal to the axle disconnect clutch 150 to engage the axle disconnect clutch 150.

Once the axle assembly 130 is in the synchronization state 242, the axle assembly 130 will transition to a third state or transition back to the 6x2 state 240. As used herein, the phrase "third state" may be used to describe a 6x4 state 244. When the axle assembly 130 is in a 6x4 state 244, the axle assembly 130 may provide a positive or negative traction force to the vehicle. The axle assembly 130 may remain in the synchronization state 242 for a predetermined period of time. In some embodiments, the axle assembly 130 remains in the synchronization state 242 for a predetermined period of time of less than 350 milliseconds. After the predetermined period of time has elapsed and if the axle assembly 130 has not entered the 6x4 state 244, the axle assembly 130 transitions back to the 6x2 state 240. However, during the predetermined period of time, the axle assembly 130 may transition to the 6x4 state 244.

In order for the axle assembly 130 to transition to the 6x4 state 244 from the synchronization state 242, one or more conditions may be satisfied. For example, in order for the axle assembly 130 to transition to the 6x4 state 244 from the synchronization state 242, the first controller 200 may determine if a corrected motor speed is within a predetermined threshold of the wheel speed. As used herein, the phrase "corrected motor speed" refers to a motor speed of the electric motor generator 142 compensating for any gearbox transmission ratio. In some embodiments, the transmission ratio may be a gear reduction. In other embodiments, the transmission ratio may be an overdrive. In this example, a signal from a wheel speed sensor indicative of a wheel speed of a wheel 140 is provided to the first controller 200. Also, the predetermined threshold of the wheel speed may equal to the wheel speed ±40 rpm. In this example, the electric motor generator 142 may be utilized as a synchronizer to get the speed difference across the axle disconnect clutch 150 to within an acceptable range of the wheel speed. In some embodiments, the first controller 200 may provide a signal indicative of a set point speed to the electric motor generator 142 and the electric motor generator 142 may provide a controlled motor speed. As another example, the axle assembly 130 may not transition to the 6x4 state 244 from the synchronization state 242 until the first controller 200 receives a signal from an axle disconnect clutch sensor indicating that the axle disconnect clutch 150 is engaged. In some embodiments, the axle assembly 130 may not transition to the 6x4 state 244 from the synchronization state 242 unless the shift actuator is in a non-neutral position.

As noted above, the shift actuator may be provided as a portion of the gearbox 146. The shift actuator may include a fork or another mechanism to select a desired gear reduction. The shift actuator enables the gearbox 146 to be in driving engagement with the differential gear set 132. When the shift actuator is in a non-neutral position, the shift actuator may be in a 6x4 position. The shift actuator may be in a 6x4 Hi position or a 6x4 Low position. In some embodiments, when the shift actuator is the in 6x4 Hi position, the gearbox 146 provides a first gear speed reduction and, when the shift actuator is in the 6x4 Low position, the gearbox 146 provides a second gear speed reduction. The first gear speed reduction may be less than the second gear speed reduction. The axle assembly 130 may transition to the 6x4 state 244 from the synchronization state 242 when all three of the above-described conditions have been satisfied.

In the 6x4 state 244, the gearbox 146 may be in driving engagement with the differential gear set 132. The 6x4 state 244 may comprise one or more substates and the axle assembly 130 may operate in each of the substates. Alternatively, from the 6×4 state 244, the axle assembly 130 may transition to another state. For example, in an embodiment, the axle assembly 130 may transition to a fourth state 246. As used herein, the phrase "fourth state" may be used to describe an actuator neutral state 246. In some embodiments, the axle assembly 130 transitions from the 6×4 state 244 to the actuator neutral state 246 when cruise control is activated, a road grade is below a predetermined road grade threshold, and a predetermined period of time has elapsed. In an embodiment, the predetermined road grade threshold is greater than 0.5 degrees. In other embodiments, the vehicle must be traveling at a speed that is greater than a predetermined vehicle speed in order to transition from the 6×4 state 244 to the actuator neutral state 246.

In some embodiments, the axle assembly 130 will remain in the actuator neutral state 246 so long as the motor speed is above a predetermined motor speed threshold. In an embodiment, the predetermined motor speed threshold is more than 200 rpm. This feature helps protect the electric motor generator 142 and other components of the axle assembly 130 from damage that would be caused by a sudden shift occurring at high motor speeds.

However, from the actuator neutral state 246, the axle assembly 130 transitions to the 6x2 state 240. In an embodiment, the axle assembly 130 may transition from the actuator neutral state 246 to the 6x2 state 240 after the first controller 200 sends a signal to the shift actuator to disconnect the gearbox 146 from driving engagement with the differential gear set 132. The axle assembly 130 may transition from the actuator neutral state 246 to the 6x2 state 240 after the first controller 142 sends a signal to the gearbox 146 to urge the shift actuator into a neutral position. Once the shift actuator is in the neutral position, the first controller 200 may receive a signal indicative of the shift actuator being in the neutral position.

Figure 4:
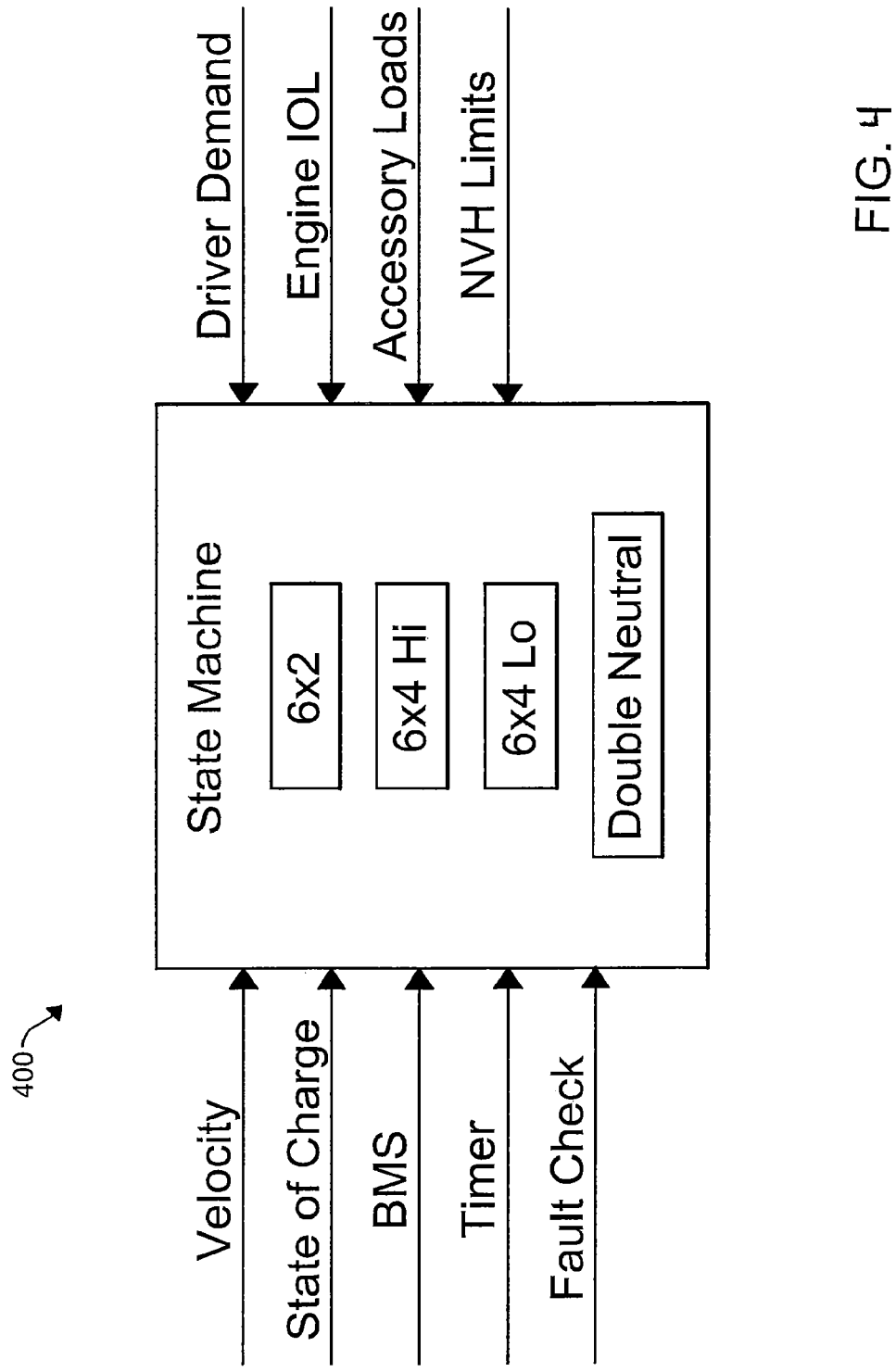
FIG. 4 is a schematic view of an embodiment of a state machine.

After the first controller 200 receives a signal indicating that the shift actuator is in the neutral position, the first controller 200 may send and receive one or more signals during the transition from the actuator neutral state 246 to the 6x2 state 240. For example, in an embodiment, the first controller 200 may send a signal to the axle disconnect clutch 150 to disengage. In this embodiment, the first controller 200 may receive a signal from an axle disconnect clutch sensor indicative of the axle disconnect clutch 150 being disengaged. When the shift actuator is in the neutral position and the axle disconnect clutch 150 is disengaged, the axle assembly 130 may be referred to as being in "double neutral," which is illustrated in FIG. 4. In another embodiment, the first controller 200 may send a signal to the electric motor generator 142 to deactivate during the transition from the actuator neutral state 246 to the 6x2 state 240. More particularly, in this embodiment, the first controller 200 may send a signal to the electric motor generator 142 to be at motor speed set point of 0 rpm. Also, optionally, the first controller 200 may receive a signal indicating that the electric motor generator 142 is at motor speed of 0 rpm during the transition to the 6x2 state 240. It may be desirable to speed control the electric motor generator 142 to 0 rpm or zero speed to reduce loss associated with the axle 134.

As noted above, the 6×4 state 244 may comprise one or more substates. In some embodiments, the 6×4 state 214 comprises a 6×4 Hi substate 248, 6×4 Low substate 250, 6×4 assist substate 252, or a generate substate 254. In an embodiment, the axle assembly 130 may operate in the 6×4 Hi substate 248, 6×4 Low substate 250, 6×4 assist substate 252, or the generate substate 254.

In the 6×4 Hi substate 248 and the 6×4 low substate 250, the axle assembly 130 is providing a traction force. In some embodiments, the axle assembly 130 enters the 6×4 Hi substate 248 from the synchronization state 242 when the vehicle speed is above a predetermined vehicle speed threshold. In some embodiments, the axle assembly 130 may be in the 6×4 Hi substate when the vehicle speed is greater than 5 miles per hour (mph). When the axle assembly 130 enters the 6×4 Hi substate 248 from the synchronization state 242, the shift actuator is in the 6×4 Hi position so that a desired gear reduction is provided. In an embodiment, the gear reduction provided in the 6×4 Hi position may be about 4:1.

In some embodiments, the axle assembly 130 enters the 6×4 Low substate 250 from the synchronization state 242 when the vehicle speed is below a predetermined vehicle speed threshold. In an embodiment, the axle assembly 130 may be in the 6×4 Low substate 250 when the vehicle speed is less than 5 mph. When the axle assembly 130 enters the 6×4 Low substate 250 from the synchronization state 242, the shift actuator is in the 6×4 Low position so that a desired gear reduction is provided. In an embodiment, the gear reduction provided in the 6×4 Low position may be about 64:1.

If the axle assembly 130 is in the 6×4 Hi substate 248 and the vehicle speed drops below a predetermined vehicle speed threshold, then the axle assembly 130 may transition to the 6×4 Low substate 250. Before entering the 6×4 Low substate 250 from the 6×4 Hi substate 248, the axle assembly 130 may enter a transition shift actuator substate 256. In the transition shift actuator substate 256 and when transitioning to the 6×4 Low substate 250, the axle disconnect clutch 150 is disengaged, the electric motor generator 142 functions as a synchronizing device bringing the axle speed of the axle 134 to a desired speed before the axle disconnect clutch 150 is re-engaged, and the shift actuator moves to the 6×4 Low position. In embodiments where the electric motor generator 142 functions as a synchronizing device to bring the axle speed of the axle 134 to a desired speed, the first controller 200 sends a signal to the electric motor generator 142 indicating a motor speed for the electric motor generator 142 to provide.

Similarly, if the axle assembly 130 is in the 6×4 Low substate 250 and the vehicle speed increases above a predetermined vehicle speed threshold, then the axle assembly 130 may transition to the 6×4 Hi substate 248. Before entering the 6×4 Hi substate 248 from the 6×4 Low substate 250, the axle assembly 130 may enter the transition shift actuator substate 256. In the transition shift actuator substate 256 and when transitioning to the 6×4 Hi substate 248, the axle disconnect clutch 150 is disengaged, the electric motor generator 142 functions as a synchronizing device bringing the axle speed of the axle 134 to a desired speed before the axle disconnect clutch 150 is re-engaged, and the shift actuator moves to the 6×4 Hi position. In certain embodiments, the predetermined vehicle speed threshold for transitioning the axle assembly 130 from the 6×4 Hi substate 248 to the 6×4 Low substate 250 may be different than the predetermined vehicle speed threshold for transitioning the axle assembly 130 from the 6×4 Low substate 250 to the 6×4 Hi substate 248. Thus, in one such embodiment, the axle assembly 130 transitions from the 6×4 Hi substate 248 to the 6×4 Low substate 250 at a first predetermined vehicle speed threshold and the axle assembly 130 transitions from the 6×4 Low substate 250 to the 6×4 Hi substate 248 at a second predetermined vehicle speed threshold. In this embodiment, the first predetermined vehicle speed threshold is less than the second predetermined vehicle speed threshold.

From the 6×4 Hi substate 248 or the 6×4 low substate 250, the axle assembly 130 can enter a 6×4 assist substate 252. In the 6×4 assist substate 252, the electric motor generator 142 can respond to a driver's request for more power. When the axle assembly 130 is in the 6×4 assist substate 252, a control algorithm executed by the first controller 200 may provide commands to split power between the power source 112 and the electric motor generator 142 based on the status of the electric motor generator 142.

From the 6×4 Hi substate 248, the axle assembly 130 can enter the 6×4 assist substate 252 when the cruise control is deactivated and the available amount of electrical energy from the source of power 144 is within a predetermined range. In certain embodiments, the predetermined range is 25-85% of the total amount of electrical energy that the source of power 144 can store. In other embodiments, the axle assembly 130 can enter the 6×4 assist substate 252 from the 6×4 Hi substate 248 when the cruise control is activated. When the cruise control is activated, the axle assembly 130 can enter the 6×4 assist substate 252 from the 6×4 Hi substate 248 under certain conditions. In some embodiments, the axle assembly 130 can enter the 6×4 assist substate 252 from the 6×4 Hi substate 248 when the available amount of electrical energy from the source of power 144 is within a predetermined range and a road grade is above a predetermined road grade threshold. In one such embodiment, the predetermined road grade threshold is greater than 0.5 degrees.

From the 6x4 Hi substate 248 or the 6x4 low substate 250, the axle assembly 130 can enter a generate substate 254. In the generate substate 254, a portion of the kinetic energy of the vehicle is converted into electrical energy. The electrical energy can be utilized to increase the available amount of electrical energy provided by the source of power 144. As illustrated in FIG. 2, the generate substate 254 may comprise one or more separate substates. In an embodiment, the generate substate 254 comprises one or more of a coasting regeneration sub state 258, regenerative braking substate 260, downhill generate substate 262, and a battery replenish substate 264. The generate substate 254 may comprise the coasting regeneration substate 258, regenerative braking substate 260, downhill generate substate 262, and battery replenish substate 264.

From the 6×4 Hi substate 248 or the 6×4 low substate 250, the axle assembly 130 can enter a generate substate 254. In the generate substate 254, a portion of the kinetic energy of the vehicle is converted into electrical energy. The electrical energy can be utilized to increase the available amount of electrical energy provided by the source of power 144. As illustrated in FIG. 2, the generate substate 254 may comprise one or more separate substates. In an embodiment, the generate substate 254 comprises one or more of a coasting regeneration substate 258, regenerative braking substate 260, downhill generate substate 262, and a battery replenish substate 264. Preferably, the generate substate 254 comprises the coasting regeneration substate 258, regenerative braking substate 260, downhill generate substate 262, and battery replenish substate 264.

The coasting regeneration substate 258 may be utilized when it is desired to decelerate the vehicle. In this substate, the electric motor generator 142 may be used to generate electrical energy and transfer the energy generated to the source of power 144 for storage and later use. In some embodiments of the coasting regeneration substate 258, the electric motor generator 142 is utilized to oppose the rotation of the axle 134, which causes the vehicle to maintain a desired speed and the electric motor generator 142 to generate electrical energy.

The axle assembly 130 may enter the coasting regeneration substate 258 under one or more predetermined conditions. For example, the axle assembly 130 may enter the coasting regeneration substate 258 when the accelerator position pedal is in a predetermined position. In an embodiment, the predetermined position of the accelerator position pedal may be an inactive position. In this position, the driver of the vehicle is not depressing the accelerator position pedal to accelerate the vehicle, e.g. the driver has taken his foot off the accelerator position pedal. To determine if the accelerator position is in the predetermined position noted above, the accelerator pedal position sensor 202 may send a signal to the first controller 200. The signal sent by the accelerator pedal position sensor 202 is indicative of the position of the accelerator position pedal. If the first controller 200 determines that the accelerator position pedal is not in the predetermined position, then the axle assembly 130 may not enter the coasting regeneration substate 258. If the first controller 200 determines that the accelerator position pedal is in the predetermined position, then the axle assembly 130 may enter the coasting regeneration substate 258.

In other embodiments, the axle assembly 130 enters the coasting regeneration substate 258 when the brake light switch is deactivated. The brake light switch communicates with mechanical foundation brakes of the axle 134. When the brake light switch is deactivated, the driver of the vehicle is not using the mechanical foundation brakes to decelerate the vehicle. To determine the status of the brake light switch, a signal may be sent to the first controller 200. The signal is indicative of the status of the brake light switch. If the first controller 200 determines that the brake light switch is activated, then the axle assembly 130 may not enter the coasting regeneration substate 258. However, if the first controller 200 determines that the brake light switch is deactivated, then the axle assembly 130 may enter the coasting regeneration substate 258.

In other embodiments, the axle assembly 130 enters the coasting regeneration substate 258 when the speed of the vehicle is greater than a predetermined vehicle speed threshold. To determine if the speed of the vehicle is greater than the predetermined vehicle speed threshold, a signal may be sent to the first controller 200. The signal is indicative of the speed of the vehicle. The signal may be sent to the first controller 200 from a wheel speed sensor. If the first controller 200 determines that the speed of the vehicle is less than a predetermined vehicle speed threshold, then the axle assembly 130 may not enter the coasting regeneration substate 258. However, if the first controller 200 determines that the speed of the vehicle is greater than a predetermined vehicle speed threshold, then the axle assembly 130 may enter the coasting regeneration substate 258.

In some embodiments, the axle assembly 130 is in the coasting regeneration substate 258 when a gear of the gearbox 146 is less than a predetermined gear threshold. To determine if the gear of the gearbox 146 is less than a predetermined gear threshold, a signal may be sent to the first controller 200. The signal is indicative of the current gear of the gearbox 146. The signal may be sent to the first controller 200 from the shift actuator position sensor. If the first controller 200 determines that the gear is greater than a predetermined gear threshold, then axle assembly 130 may not enter the coasting regeneration substate 258. However, if the first controller 200 determines that the gear of the gearbox 146 is less than a predetermined gear threshold, then axle assembly 130 may enter the coasting regeneration substate 258.

The axle assembly 130 may be in the coasting regeneration substate 258 when the accelerator position pedal is in a predetermined position, the brake light switch is not activated, the speed of the vehicle is greater than a predetermined vehicle speed threshold, and the gear of the gearbox 146 is less than a predetermined gear threshold. In certain embodiments, the axle assembly 130 may remain in the coasting regeneration substate 258 as long as the conditions noted above are met. In other embodiments, the axle assembly 130 may remain in the coasting regeneration substate 258 for a predetermined period of time as long as the conditions noted above are met.

The regenerative braking substate 260 may be utilized when it is desired to decelerate the vehicle. In this substate, the electric motor generator 142 may be used to generate electrical energy and transfer the energy generated to the source of power 144 for storage and later use. In some embodiments of the regenerative braking substate 260, the electric motor generator 142 is utilized as a braking device that opposes the rotation of the axle 134, which causes the vehicle to decelerate and the electric motor generator 142 to generate electrical energy. In certain embodiments, the regenerative braking substate 260 may be a series or a parallel implementation between the mechanical foundation brakes of the axle 134 and the electric motor generator 142, with a loss factor included to account for mechanical braking loss (friction loss, heat loss etc.) and electrical energy losses during braking (Ohmic losses). These embodiments are desirable when the electric motor generator 142 cannot provide enough braking power to decelerate the vehicle and the mechanical foundation brakes of the axle 134 can provide additional braking power to reduce the speed of the vehicle.

The axle assembly 130 may be in the regenerative braking substate 260 under one or more predetermined conditions. For example, the axle assembly 130 may be in the regenerative braking substate 260 when the brake light switch is activated. The brake light switch communicates with mechanical foundation brakes of the axle 134. When the brake light switch is activated, the driver of the vehicle is using the mechanical foundation brakes to decelerate the vehicle. Thus, when it is desired to decelerate the vehicle, the electric motor generator 142 may be utilized as a braking device and to generate electrical energy for storage and later use.

To determine the status of the brake light switch, a signal may be sent to the first controller 200. The signal is indicative of the status of the brake light switch. If the first controller 200 determines that the brake light switch is activated, then axle assembly 130 may enter the regenerative braking substate 260. However, if the first controller 200 determines that the brake light switch is deactivated, then axle assembly 130 does not enter the regenerative braking substate 260.

It may be desirable for the axle assembly 130 to enter or be in the downhill generate substate 262 under certain conditions. For example, when the vehicle is descending a steep grade it may be desirable for the axle assembly 130 to enter or be in the downhill generate substate 262. The axle assembly 130 may be in the downhill generate substate 262 when it is desired to decelerate the vehicle to maintain the vehicle at a constant speed as the vehicle is in a descent.

In the downhill generate substate 262, the electric motor generator 142 may be used to generate electrical energy and transfer the energy generated to the source of power 144 for storage and later use. In some embodiments of the downhill generate substate 262, the electric motor generator 142 is utilized as a braking device that opposes the rotation of the axle 134, which decelerates the vehicle and causes the electric motor generator 142 to generate electrical energy.

In an embodiment, the downhill generate substate 262 may be a series or a parallel implementation between an engine brake and the electric motor generator 142. This embodiment is desirable when the electric motor generator 142 cannot provide enough braking power to decelerate the vehicle to maintain the vehicle at a constant speed. Under these conditions, additional braking power can be provided by an engine brake. It should be noted that in these embodiments, the power source 112 is an internal combustion engine. To determine if the engine brake is needed, the first controller 200 receives a signal from a wheel speed sensor indicative of the vehicle speed. The first controller 200 determines if the vehicle speed is greater than a desired vehicle speed. If the vehicle speed is greater than a desired vehicle speed, then the engine brake is utilized to decelerate the vehicle. In an embodiment, the engine brake may be engaged after an engine braking switch has been activated. Once activated, a signal may be sent to the first controller 200 indicating that the engine braking switch has been activated. In another embodiment, the internal combustion engine is operably coupled to the first axle 110 by way of the clutch 114 to engage the engine brake and decelerate the vehicle. Engine brakes and the associated methods of engine braking that are known in the art are suitable for use in the downhill generate substate 262.

The battery replenish substate 264 may be utilized when it is desired to transfer electrical energy to the source of power 144 for storage and later use. It may be desirable to utilize the battery replenish substate 264 when, for example, the amount of electrical energy available from the source of power 144 is below a predetermined threshold. For example, when the available amount of electrical energy from the source of power 144 below 25% of the total amount of electrical energy that the source of power 144 can store it may be desirable to enter and/or be in the battery replenish substate 264.

In a battery replenish substate 264, the power source 112 powers the vehicle and replenishes the source of power 144 until the amount of electrical energy available from the source of power 144 is within a predetermined range. In an embodiment, the predetermined range is 25-35% of the total amount of electrical energy that the source of power 144 can store. In some embodiments, the amount of electrical energy available from the source of power 144 can be estimated by the SOC estimator based on the physical characteristics of the source of power 144.

It may be desirable to enter the battery replenish substate 264 during highway cruising, e.g. when cruise control is activated, and when there is sufficient power available to surpass the driver demand without going beyond an engine reserve power. As the power source 112 moves the vehicle, the electric motor generator 142 opposes the rotation of the axle 134, which causes the electric motor generator 142 to generate the electrical energy desired in the battery replenish substate 264. Thus, it should be noted that, in the battery replenish substate 264, the power source 112 replenishes the source of power 144 even though it is not in mechanical communication with the electric motor generator 142. Thus, in some embodiments, the power source 112 replenishes the source of power 144 by way of the road.

In some embodiments, the first controller 200 comprises a state machine 400. An embodiment of the state machine 400 is illustrated in FIG. 4. The state machine 400 includes a 6×2 state, 6×4 high substate, and 6×4 low substate. The state machine 400 is configured to receive a number of signals. For example, input signals optionally include vehicle velocity, battery state of charge, mode hysteresis timer, faults, and diagnostic checks, electric motor/generator limits, BMS limits, driver demand, engine IOL, warmup and emissions targets, cooling requirements, accessory loads, transmission ratio for desired powersplit, noise vehicle harshness (NVH) limits, among others. It should be appreciated that input signals to the first controller 200 are information from sensors and CAN information. In an embodiment, the state machine 400 is configured to receive input signals from sensors, CAN information, or estimators. In certain embodiments, estimators are observers or virtual sensors implemented in the first controller 200. In one embodiment, estimators are observers or virtual sensors implemented in the first controller 200. During operation of a vehicle that includes the first controller 200, adjusting the powersplit to obtain the highest overall efficiencies of the engine and electric motor/generators is desired. In some embodiments, the first controller 200 provides a powersplit between the engine and the electric motor/generator based at least in part on driver demand.

Figure 5:
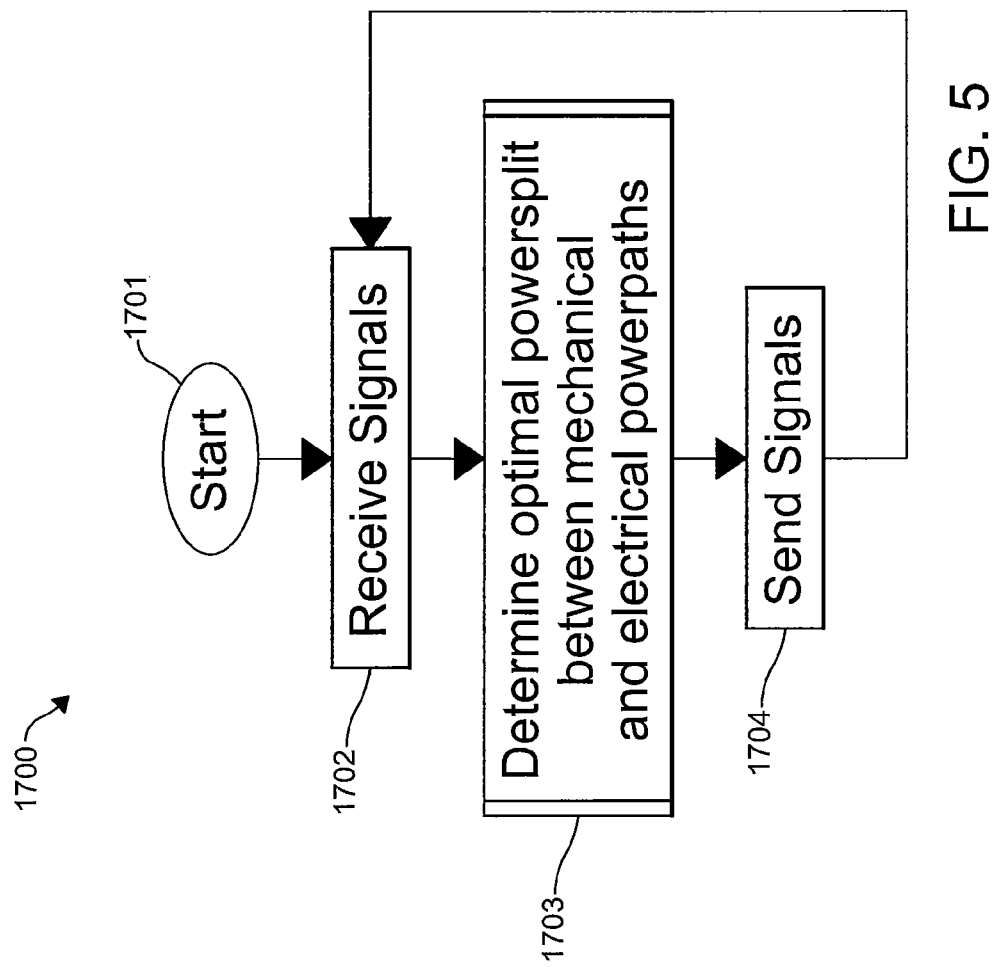
FIG. 5 is a schematic view of an embodiment of a control process.

Referring now to FIG. 5, in some embodiments, the first controller 200 is adapted to implement a control process 1700. The control process 1700 begins at a start state 1701 and proceeds to a block 1702 where a number of operating condition signals are received. The control process 1700 proceeds to a block 1703 where an optimal powersplit between the mechanical powerpath and the electrical powerpath is determined based at least in part on the signals received in the block 1702.

In some embodiments, block 1703 optionally executes an equivalent consumption minimization strategy (ECMS) that computationally provides solutions for an optimal powersplit between the engine and the electric motor/generators based at least in part on the fuel consumption rate of the engine and the equivalent power stored for the electric motor/generators. Other real time computational optimization techniques are optionally implemented in the block 1703 to provide instantaneous optimization in real time operation. The control process 1700 proceeds to a block 1704 where a number of command or output signals are sent to other modules in the first controller 200.

Figure 6:
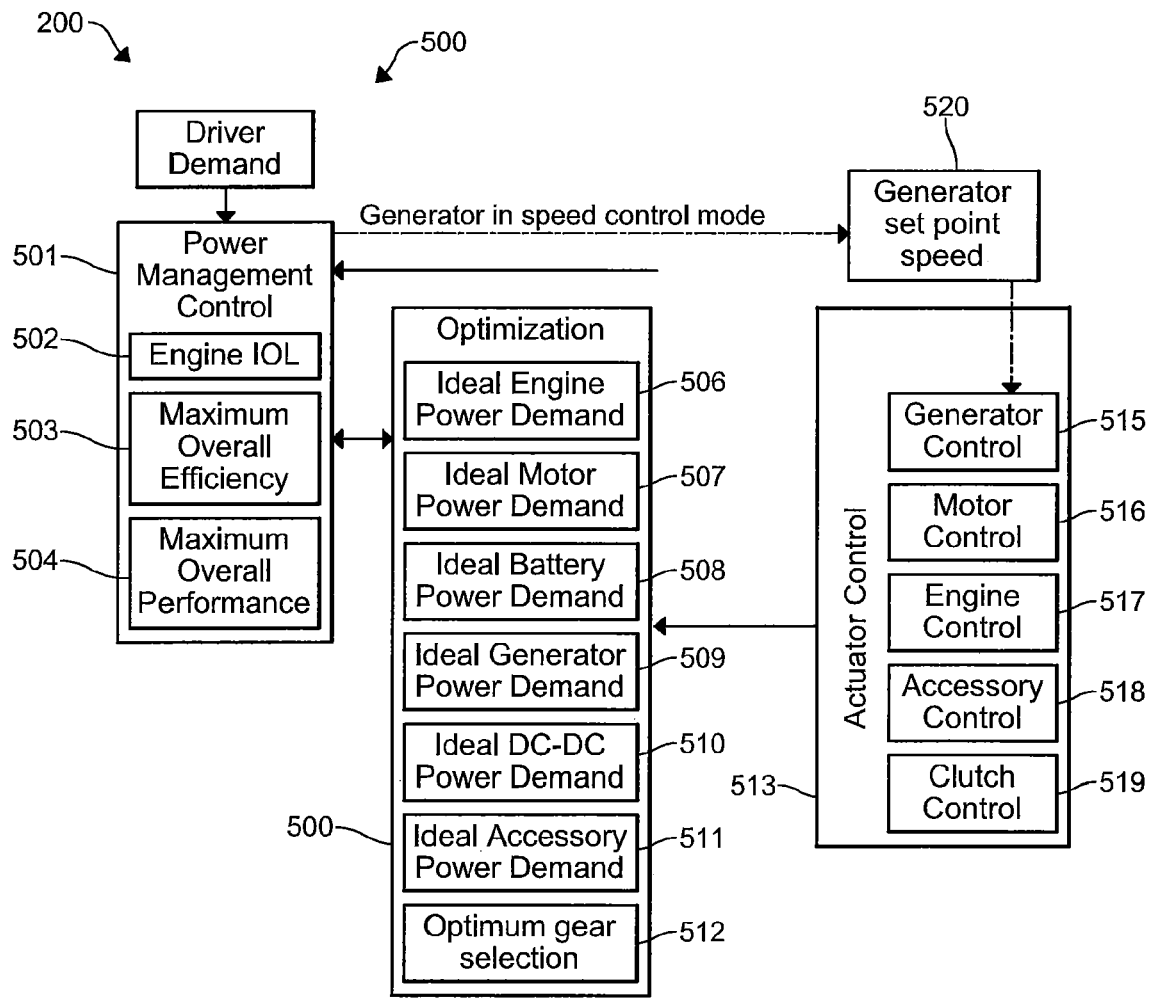
FIG. 6 is a schematic view of an embodiment of a powersplit module.

In some embodiments, the block 1703 includes optimal powersplit module 500, which is illustrated in FIG. 6. In some embodiments, the optimal powersplit module 500 is configured to receive a number of signals from the vehicle sensors, for example, the accelerator pedal position sensor 202 and the brake pedal position sensor 204. The optimal powersplit module 500 is configured to execute software instructions to assess the desired vehicle performance requested by the operator of the vehicle. In some embodiments, the optimal powersplit module 500 determines how much power should be provided by the power source 112 and how much power should be provided by the electric motor generator 142 when the vehicle is accelerating or operating at a constant vehicle speed. In other embodiments, the optimal powersplit module 500 determines how much power should be provided by the electric motor generator 142 and the mechanical foundation brakes of the axle 134 when it is desired to decelerate the vehicle. In still other embodiments, the optimal powersplit module 500 determines how much power should be provided by the engine brake and the electric motor generator 142 when it is desired to generate electrical energy and transfer the energy generated to the source of power 144.

The optimal powersplit module 500 is in communication with the power management control module 501. In general, the demand in power (Pdemand)=Peng+/− Pmot(1)+/− Pmot(2) in a P0+P4 or P2+P4 system. In such cases, the first controller 200 implements an equivalent charge minimization strategy (ECMS) or an adaptive ECMS (A-ECMS) to determine what the powersplit for optimum overall mechanical and electrical costs.

In some embodiments, the power management control module 501 includes an engine IOL module 502, a maximum overall efficiency module 503, and a maximum overall performance module 504. The power management control module 501 is in communication with an optimization module 505. The optimization module 505 is configured to include a number of sub-modules adapted to execute software algorithms such as optimizers, estimators, and observers, among others, which perform dynamic estimations in real time to compute optimal powertrain state that then acts as a driving input to a powertrain state machine, for example, the state machine 400, among others not shown.

In some embodiments, the first controller 200 determines a powersplit for a given driver/operator demand by running the engine on an optimum line of operation (based on optimum BSFC/ideal line of operation (IOL) at an optimal gear.

In some embodiments, the optimization module 505 includes an ideal engine power demand sub-module 506. The ideal engine power demand sub-module 506 is configured to determine ideal operating conditions for the engine. The optimization module 505 includes an ideal motor power demand sub-module 507. The ideal motor power demand sub-module 507 is adapted to determine the ideal operating conditions for the motor or motors equipped on the vehicle at an optimal gear. The optimization module 505 includes an ideal battery demand sub-module 508. The ideal battery demand sub-module 508 is configured to be in communication with a battery management system (BMS), and provides feedback to the power management control module 501 for powersplit control based on continuous power requirements and cooling load of the battery system equipped in the vehicle. The optimization module 505 includes an ideal generator power demand sub-module 509 configured to estimate the generator power required for a charge sustain operation. The ideal generator power demand sub-module 509 is optionally configured to estimate ideal operating conditions for the generator.

In some embodiments, the optimization module 505 includes an optimum gear selection module 512.

If the electric motor generator 142 is providing full power for a given amount of time duration, then the first controller 200 can adjust the powersplit so that the power source 112 provides less power thereby lowering the fueling demand especially for transient events, including, but not limited to, hard accelerations and increased driver demand due to increased grade.

If the electric motor generator 142 reaches a fault state, the first controller can send a signal to disconnect the electric motor generator 142 from the powertrain, thereby allowing the vehicle drivetrain 100 to run as a conventional vehicle.

In some embodiments, the axle assembly 130 is used in conjunction with supporting hybrid systems including additionally electric motor generators and accessory systems. The first controller 200 can therefore provide a powersplit to account for both electric motor generator(s) 142, the power source 112 in addition to losses incurred due to auxiliary systems and other electrical and mechanical losses.

In some embodiments, the first controller 200 provides a fuel-efficient eco mode such that power from the power source (Peng) is the optimum power line of the power source (Peiol).

In some embodiments, the first controller 200 provides a performance mode calibrated to provide maximum performance characteristics including, but not limited to, launch performance, 0-45 mph, 0-65 mph, 45-65 mph performance.

In some embodiments, the first controller 200 adjusts the performance mode to include reserve power for grades, so that in the event of sustained grade when the electric motor generator power is maxed and the reserve power of the power source is used to negotiate the increase of the grade.

In some embodiments, the event of a sustained grade is detected by a GPS based system or other grade detection control logic.

During operation of a vehicle that includes the first controller 200 adjusting the powersplit to achieve the highest overall efficiency of the drivetrain is desired.

Referring now to FIG. 7, in some embodiments, the first controller 200 is adapted to implement a control process 1800. The control process 1800 begins at a start state 1801 and proceeds to a block 1802 where a number of operating condition signals are received. The control process 1800 proceeds to a block 1803 where a number of stored optimized variables for the powersplit between the mechanical powerpath and the electrical powerpath are retrieved from memory.

In some embodiments, the stored optimized variables for powersplit are determined by dynamic programming methods. Dynamic programming is a control methodology for determining an optimal solution in a multiple variable system.

In some embodiments, it is used in a deterministic or a stochastic environment, for a discrete time or a continuous time system, and over a finite time horizon, or an infinite time horizon. Control methodologies of this type are often referred to as horizon optimization. For example, the stored optimized variables are determined by collecting data from a number of vehicle signals during operation of the vehicle.

In some embodiments, standard drive cycle conditions used for federal emissions testing are used to operate the vehicle.

Dynamic programing computational techniques are used to analyze the collected data and find optimal powersplit solutions to provide desired system efficiency. The solutions are typically further analyzed through computational simulation or other means to provide a comprehensive rule-based model of the powertrain system. The rule-based model, along with any other solutions formulated from dynamic programming techniques, are stored as optimized variables and made available to the control process 1800 in the block 1803. It should be appreciated, that a number of other optimization techniques are optionally implemented to populate the block 1803 with stored optimized variables. For example, convex optimization, Pontryagins Minimum Principle (PMP), stochastic dynamic programming, and power weighted efficiency analysis (PEARS), among others, are options.

In some embodiments, the control process 1800 proceeds to a block 1804 where algorithms and software instructions are executed to determine the powersplit between the mechanical powerpath and the electrical powerpath based at least in part on the signals received in the block 1802 or retrieved from memory in the block 1803. The control process 1800 proceeds to a block 1805 where command or output signals are sent to other modules in the first control system 200.

When the drivetrain is operating in an assist mode, the first controller 200 splits the power between the electric motor generator 142 and the power source 112 optimally based on the ideal operation line (IOPL). The assist mode works in both a full power and a continuations power ranges.

In some embodiments, a power based pedal map can be used to split the power between the power source 112 and the electric motor generator 142 such that the power source 112 runs on an optimal line (ideal operating line), and the transient power is taken up by the electric motor generator 142 and the average power by the power source 112.

In some embodiments, the first controller 200 sends a filtered response of a demand power signal out of the combined engine and motor demand power map(s) with a dynamic rate limiter and saturation in place to limit the min and max power, and the rate of rise of the engine power signal to determine power that the power source 112 would then have to produce. The remnant power Pmot=(Pdemand−Pengfl), where Pengfl is the filtered and the rate limited and saturated power to be delivered by the engine, is to be provided by the electric motor generator 142. A separate rate limiter is applied to the electric motor generator 142. The first controller 200 then compares motor power with the power that the electric motor generator 142 is capable of providing (based on Voltage, derate status, fault status etc.) at that instant. If the electric motor generator 142 can deliver this power, it provides the power, if not, the demand power is met by power source 112, such that Pengflad=Pdemand−Pmotnew, where Pengflad is the adjust engine power demand, and Pmotnew is the adjusted motor power demand.

The dynamic rate limiter and saturation on both the electric motor generator 142 and the power source 112 can be adjusted real time such that an optimal scheme based on a cost function that takes into account the mechanical and electrical consumptions/costs of the overall hybrid powertrain system and additional constraints (such as NVH, efficiency etc.).

In some embodiments, additional power loss factors are taken into account including power source 112, vehicle drivetrain 100, and electrical components losses as well accessory losses.

It should be noted that this architecture can be expanded to include unique torque estimation strategies. In some embodiments, the first controller 200 estimates engine torque by applying a filtering technique (i.e. a fast fourier transform) on a known signal such as an angular acceleration signal, and determines the torque to the front of the drive axle (front-rear) for vehicle dynamics estimations or diagnostics checks. The axle assembly ratio is an indication of the torque at the tag (torque at rear). The summation of the front-rear and rear-rear is an indicator of total torque at wheels and whether the powersplit algorithms are leading to the right torque split, i.e. these observers can be used as feedback for prognosis/diagnostics.

When the axle assembly 130 is capable of producing supplemental power, then shift optimization can be used to control the operation of the vehicle drivetrain 100. In some embodiments, a vehicle control system utilizes a shift optimization map. The power source 112 can be operated on an IOL in drivetrains with a manual/automatic/automated manual gearbox with discrete ratios. The gearbox ratio is adjusted to run the power source 112 in an optimal BSFC area by upshifting earlier or such that the fueling rate is less by downshifting in the 6×4 state, based on the power delivered by the electric motor generator 142. The shift map is optimized based on constraints such as emissions towing, grade, engine brake, kick down etc. (in addition to BSFC) by imposing modified rules or using dynamic offline or online optimizations.

It should be noted that these control strategies are applicable to a great extent if the vehicle drivetrain does not include an internal combustion engine and is a battery electric (BEV) or a fuel cell powertrain in a BEV or FCEV configuration. The powersplit in this case will not include an internal combustion engine and all the power will be delivered by the electric motor generator coupled to the axle.

In some embodiments, a power takeoff unit (PTU) is connected to the power source and the electric motor generator with a selectively engageable clutching unit. If the AMT clutch and the axle assembly clutch are both disengaged, then the resulting Auxiliary Power Unit (APU) can be used to provide energy back to the grid in a Plug In Hybrid Electric Vehicle (PHEV) or BEV configuration using the selectively engageable clutching unit.

While the certain embodiments have been shown and described herein, it will be obvious to those skilled in the art that such embodiments are provided by way of example only. Numerous variations, changes, and substitutions will now occur to those skilled in the art without departing from the embodiments. It should be understood that various alternatives to the embodiments described herein are capable of being employed in practicing the invention.

The invention claimed is:

1. A method of controlling an axle assembly, comprising:
   providing an axle assembly in a first state; and
   providing a first controller in electrical communication with the axle assembly, the first controller determining if a source of power has an available amount of electrical energy that is within a predetermined range and a predetermined period of time has elapsed;
   wherein if the available amount of electrical energy is within the predetermined range and the predetermined period of time has elapsed, then transferring electrical energy from the source of power to an electric motor generator and engaging an axle disconnect clutch to provide the axle assembly in another state.

2. The method of claim 1, further comprising determining if a brake light switch has been activated, a cruise control mode has been deactivated, or a road grade is above a predetermined road grade threshold.

3. The method of claim 1, wherein the electric motor generator provides a motor speed that is within a predetermined range of a wheel speed of a wheel and the first controller sends a signal to engage the axle disconnect clutch.

4. The method of claim 1, wherein, in a second state, electrical energy is transferred from the source of power to the electric motor generator and the axle disconnect clutch is engaged.

5. The method of claim 1, further comprising providing a signal indicative of a wheel speed and determining if a corrected motor speed is within a predetermined threshold of the wheel speed.

6. The method of claim 1, wherein the first controller sends a signal to engage the axle disconnect clutch.

7. The method of claim 1, wherein the first controller receives a signal from an axle disconnect clutch sensor indicative of the axle disconnect clutch being engaged.

8. The method of claim 1, wherein in a third state the axle assembly provides a traction force.

9. The method of claim 1, wherein, in a second state, the electric motor generator provides a motor speed and, in a third state, the axle disconnect clutch is engaged and the axle assembly provides a traction force.

10. The method of claim 1, wherein the another state is a second state and the axle assembly transitions to a third state, the third state comprising one or more substates.

11. The method of claim 9, wherein in the third state a gearbox is in driving engagement with a differential gear set.

12. The method of claim 9, wherein in the first state is a 6x2 state, the second state is a synchronization state, and the third state is a 6x4 state.

13. The method of claim 10, wherein the one or more substates includes a 6x4 Hi substate and a 6x4 Low substate and, from the second state, the axle assembly enters the 6x4 Hi substate when a vehicle speed is above a predetermined vehicle speed threshold or 6x4 Low substate when the vehicle speed is below the predetermined vehicle speed threshold.

14. The method of claim 11, wherein the axle assembly transitions from the third state to a fourth state when a vehicle cruise control is activated, a road grade is below a predetermined road grade threshold, and a predetermined period of time has elapsed.

15. The method of claim 13, wherein the axle assembly transitions to the 6x4 Low substate from the 6x4 Hi substate when the vehicle speed is below the predetermined vehicle speed threshold.

16. The method of claim 13, wherein the axle assembly transitions to the 6x4 Low substate from the 6x4 Hi substate by way of another substate.

17. The method of claim 13, wherein the axle assembly enters a 6x4 assist substate from the 6x4 Hi substate or the 6x4 Low substate.

18. The method of claim 13, wherein the axle assembly enters a generate substate from the 6x4 Hi substate or the 6x4 Low substate.

19. The method of claim 14, wherein the axle assembly transitions from the fourth state to the first state after the first controller sends a signal to the gearbox to urge a shift actuator into a neutral position.

20. The method of claim 14, wherein the axle assembly remains in the fourth state so long as the motor speed is above a predetermined threshold.

* * * * *